United States Patent [19]

Hosaka et al.

[11] 4,122,807
[45] Oct. 31, 1978

[54] IGNITION SPARK TIMING CONTROL SYSTEM FOR AN INTERNAL COMBUSTION ENGINE

[75] Inventors: Akio Hosaka, Yokohama; Satoshi Sakamoto, Yokosuka, both of Japan

[73] Assignee: Nissan Motor Company, Limited, Japan

[21] Appl. No.: 744,261

[22] Filed: Nov. 23, 1976

[30] Foreign Application Priority Data

Dec. 5, 1975 [JP] Japan .......................... 50/162926[U]

[51] Int. Cl.² .............................................. F02P 5/04
[52] U.S. Cl. ............................................... 123/117 R
[58] Field of Search ............. 123/117 R, 117 D, 148 E

[56] References Cited

U.S. PATENT DOCUMENTS

| 3,939,811 | 2/1976 | Sasayama | 123/117 R |
| 3,972,310 | 8/1976 | Gambill | 123/117 R |
| 3,996,911 | 12/1976 | Canup | 123/117 D X |
| 4,009,697 | 3/1977 | Chateau | 123/117 D |

Primary Examiner—Charles J. Myhre
Assistant Examiner—Tony M. Argenbright
Attorney, Agent, or Firm—Robert E. Burns; Emmanuel J. Lobato; Bruce L. Adams

[57] ABSTRACT

An ignition spark timing control system for an internal combustion engine, which comprises a reference angle signal generator to generate reference angle signals corresponding to the reference angles of each cylinder of the engine, a divider for dividing the reference angle signals to produce divided signals, and voltage-advance converters substantially operated in an alternative manner in response to said divided signals to control ignition spark timing in dependence on an advance control signal.

5 Claims, 5 Drawing Figures

IGNITION SPARK TIMING CONTROL SYSTEM FOR AN INTERNAL COMBUSTION ENGINE

BACKGROUND OF THE INVENTION

This invention relates to an internal combustion engine ignition control system for producing ignition spark triggering signals which are proportional to preset advance control voltage signals. The ignition spark timing system proposed by this invention is specifically itended to widen the variable control range.

Conventional techniques have heretofore been primarily concerned with maximizing engine output and minimizing fuel consumption. In recent years, however, efforts have been made toward reducing the unburned resides in exhaust gases by prolonging the combustion of fuel in engine equipped with an auxiliary combustion chamber. A wide variable control range is necessary when attempting to regulate the ignition spark timing in engines of this type.

According to the technique for electrically controlling spark advance in spark ignition type engine various methods have been proposed for converting the advance control voltage signals to ignition triggering signals during specific crankshaft angles. In all of these conventional methods arithmetic operations are performed for a crankshaft angle in which the angle of rotation is within approximately 90° for a four-cylinder engine; as a result, the control range is limited to only the remaining 90°. A narrow control range means that control has a tendency toward instability in the vicinity of the control limits while accuracy deteriorates; these factors contribute to a pronounced narrowing of the practical range. Some of these conventional systems have also necessitated the utilization of signals other than the reference angle signals for the top dead center positions of the pistons and this has led to a need for complicated angle signal detecting devices which is an undesirable condition.

SUMMARY OF THE INVENTION

Accordingly, object of the invention is to solve the above problems and satisfy the demands as stated by the provision of a simple and reliable ignition spark timing control system.

The narrow control range exhibited by the conventional systems is attributable to the fact that a single operation circuit performs the advance operation for all the cylinders of the engine. The present invention is adapted to provide a wide control range for spark advance by making use of two or more operation circuits which are separately actuated in a paralel manner. In addition, the adoption of an operation system which detects reference angles allows angles to be detected by means of an uncomplicated detection mechanism.

To this end the present invention is constructed of a reference angle signal generator which detects the angular position of a crankshaft and responsive thereto generates reference angle signals corresponding to the reference angle positions such as the top dead center positions of each cylinder, a divider circuit for dividing these reference angle signals and then passing the divided signals, and at least two voltage-advance converters sequentially operated in an alternative manner in response to the divided signals. to produce ignition spark triggering signals conforming to advance control signals applied as inputs thereto.

BRIEF DESCRIPTION OF THE DRAWINGS

These and other objects, features and advantages of the present invention will become more apparent from the following description when taken in conjunction with the accompanying drawings, in which.

DESCRIPTION OF THE PREFERRED EMBODIMENTS

Figure 1:
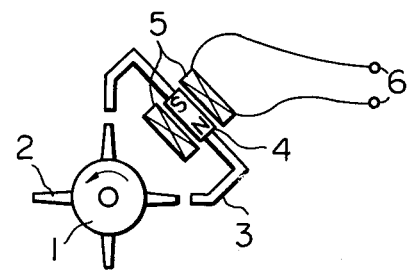
FIG. 1 is a preferred example of a reference angle signal generator employed in an ignition spark timing control system according to the present invention.
Figure 2:
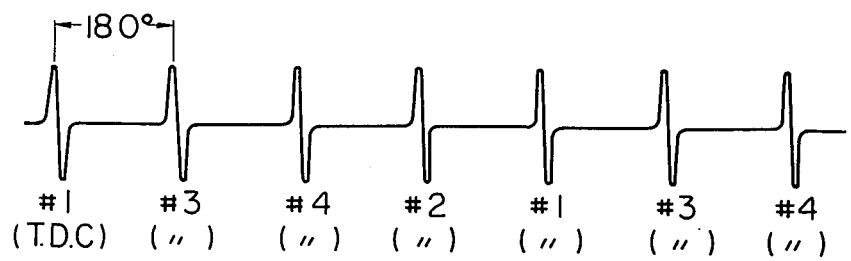
FIG. 2 is a timing chart for illustrating the output wave forms produced by the reference angle signal generator shown in FIG. 1.

Referring now to FIG. 1, there is shown a preferred example of a reference angle signal generator to be employed for an ignition spark timing control system according to the present invention. In FIG. 1, reference numeral 1 denotes a distributor rotor rotating in the direction indicated by the arrow. Rotor 1 is equipped with a detection member 2 in the form of equally spaced projections each of which corresponds to an engine cylinder; four of such projections have been adopted in the present embodiment for each of four cylinders. A magnetic pole 3 is so arranged as to form a magnetic circuit with pairs of adjacent projections of detection member 2 when the reference angle corresponding to the crankshaft angle is to be detected. Magnetic pole 3 includes permanent magnet 4 which is enclosed within a coil 5. The magnetic flux associated with coil 5 varies in response to the rotation of rotor 1 with these variations attaining maximum values in the vicinity of the reference angles so that the pulse-shaped voltage signals as shown in FIG. 2 are produced at output terminals 6. These are the reference signals representing the top dead center positions of respective cylinders.

Figure 3:
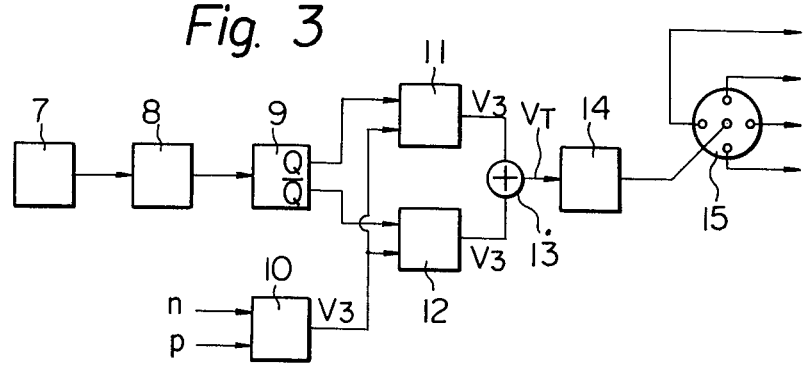
FIG. 3 is a block diagram of the ignition spark timing control system according to the present invention.

FIG. 3 is a block diagram illustrating the overall scheme of the present invention. The numeral 7 denotes the reference angle signal generator depicted in FIG. 1, reference numeral 8 denotes a wave shaping circuit, 9 a flip-flop circuit, 10 an advance characteristic control circuit for supplying an advance control signal $Ve$ determined by the rotational frequency $n$ of the engine and the engine intake manifold vacuum P, 11 and 12 first and second voltage-advance converters, 13 an adder, 14 an ignition spark unit, and 15 a distributor. The reference angle signal generated by reference angle signal generator 7 is shaped by wave shaping circuit 8 and applied to flip-flop 9 which functions as a divider. The output from flip-flop 9 is alternately applied to voltage-advance converters 11 and 12 and controls their operating sequence. These two voltage-advance converters are controlled and alternately operated in response to output signals Q and $\overline{Q}$ provided by flip-flop 9 and determine the ignition spark timing in response to the magnitude of the advance control signal $Ve$ obtained as an output from advance characteristic control circuit 10. In other words, the reference angle signal is alternately applied to two voltage-advance converters 11 and 12 which then perform arithmetic operations.

The sum of the resulting outputs is then computed by adder 13 the output of which is applied to ignition spark unit 14 such as a transistorized spark mechanism which generates a high voltage ignition spark signal for each standard angle signal as dictated by the arrival of the ignition spark trigger signals provided by adder 13. The high voltage ignition spark signals are passed via distributor 15 and cause the respective cylinder spark plugs to fire.

Figure 4:
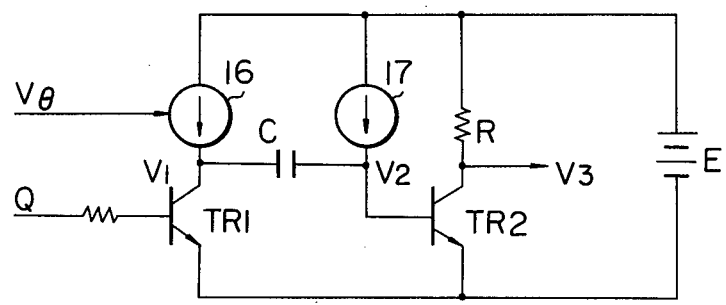
FIG. 4 is a circuit diagram for a voltage-advance converter shown in FIG. 3.
Figure 5:
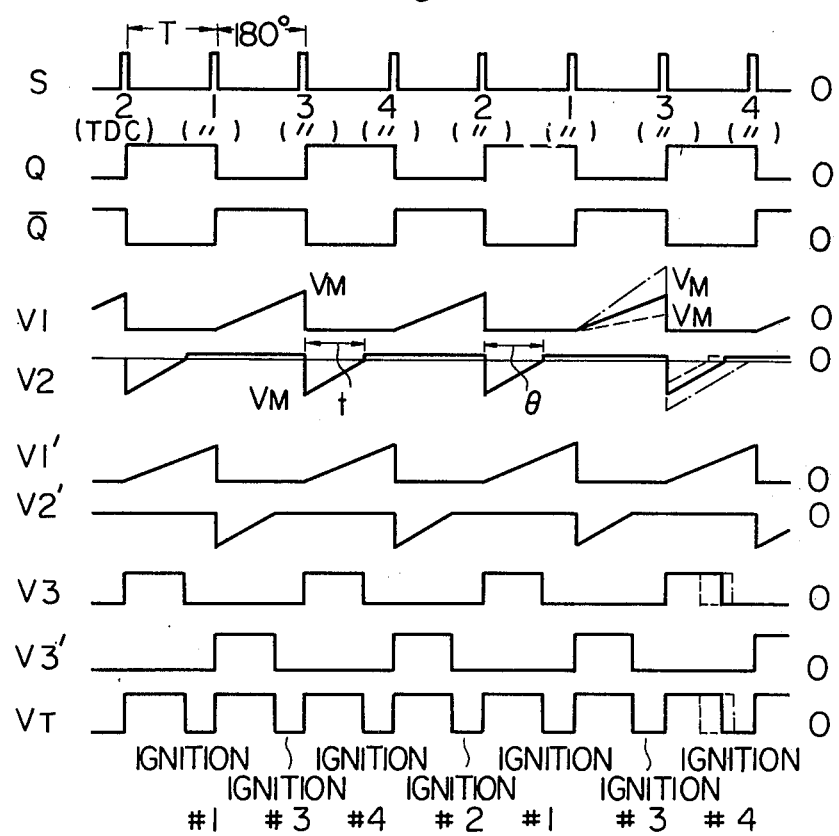
FIG. 5 is a timing chart for illustrating various wave forms associated with the voltage-advance converter of FIG. 4.

FIG. 4 is an embodiment of a voltage-advance converter and FIG. 5 is a chart illustrating various waveforms for a description of its operation.

For periods during which the output signal Q from the flip-flop (as designated by the numeral 9 in FIG. 3) is at logic 1, transistor TR1 is rendered ON so that its collector voltage V1 is at 0. When the output signal Q attains a logic 0 level transistor TR1 is rendered OFF, capacitor C is charged by a first constant current circuit 16 and the collector voltage V1 rises in a linear fashion. Since at this time constant current circuit 17 causes a constant current to flow through the base of transistor TR2, transistor TR2 will attain an ON state. The value of the current flowing through the first constant current circuit 16 is such that it will be proportional to the advance control voltage Ve. Accordingly, by the time the output Q from the flip-flop once again attains a logic 1 level and the transistor TR1 turns ON, the collector voltage V1 will attain a voltage Vm which will be proportional to the period T of the reference angle signal and the advance control signal Ve. Thus if $k$ is any constant, $Vm = k \cdot T \cdot Ve$.

Next, when transistor TR1 is rendered ON V1 falls to zero and as a consequence the base voltage V2 of transistor TR2 drops to $-Vm$ and transistor TR2 is turned OFF. Capacitor C is charged by a second constant current circuit 17 and the base voltage V2 rises in a linear fashion. Transistor TR2 is turned ON when the base voltage V2 attains a positive value. The interval $t_1$ during which transistor TR2 is in the OFF state is proportional to the voltage Vm. Thus if the constants $k'$ and $k''$ represent the respective constants of integration for the capacitor C as charged by the constant current circuits 16 and 17, $t_1 = k' \cdot Vm = k'' \cdot T \cdot Ve$. Accordingly, $t_1/T = k'' \cdot Ve$ and thus $t_1/T$ is determined by the advance control signal Ve. T is the interval between top dead center positions of adjacent cylinders and correponds to a crankshaft angle of 180°. The crankshaft angle $\theta$ corresponding to $t_1$ is proportional to the advance control signal Ve.

The voltage V3 at the base of transistor TR3 attains a logic 1 level at such time that the voltage V2 at the base of transistor TR2 is negative and assumes the rectangular waveform V3 as shown in FIG. 5; it is this waveform that is the output of voltage-advance converter 11 as illustrated in FIG. 4. In FIG. 4 R denotes a resistor and E a direct current power source capable of delivering a voltage of 12V or the like.

Second voltage advance converter 12 is controlled by the $\overline{Q}$ output of flip-flop 9 and operates as does first voltage-advance converter 11 although the reference angle signals are delayed one at a time due to the fact that $\overline{Q}$ and Q are 180° out of phase. In FIG. 5, the waveforms V1′, V2′ and V3′ produced by the second voltage-advance converter 12 correspond to the respective waveforms V1, V2 and V3 produced by the first voltage-advance converter 11.

Output signals V3, V3′ obtained from first and second voltage-advance converters 11, 12 are added by adder 13 serve as the ignition spark trigger signals $V_T$ which induce a spark upon their descent. Thus each voltage-advance converter 11, 12 produces a trigger signal for every other reference angle signal so that ultimately trigger signals are generated and sparks produced for each and every reference angle signal.

As the advance control signal Ve increase so does the amplitude Vm of the voltage V1 at the collector of the transistor. When this amplitude attains the value V′m as shown in FIG. 5 the ignition spark timing is delayed as indicated by the position of the dashed line. Conversely, a decrease in the signal Ve will reduce the amplitude Vm which will attain the value V″m as shown; this will advance the ignition spark timing as indicated by the position of the dotted line. It is thus apparent from FIG. 5 that the variable range of the ignition spark timing is substantially 180°.

The figures indicated below the reference angle signal (denoted by S in FIG. 5) and below the trigger signal $V_T$ denote the numbers assigned the cylinders. In the present embodiment two voltage-advance converters have been adopted although the variable range for the ignition spark advance can be further widened by adding additional voltage-advance converters and operating them in a successive manner.

The advance characteristic control circuit 10 may employ a function generator or memory circuit and determines the advance control signal voltage Ve in response to such engine parameters as the rotational frequency, the negative pressure upon intake or the throttle opening.

In addition to the system illustrated in the present embodiment it is also possible to employ as the voltage-advance converter a switching circuit or the like successively operated in response to an output obtained from a frequency divider.

Although the top dead center positions of the cylinders have been adopted in the present embodiment as the points corresponding to the reference angles any optional position may be adopted and the trigger signal $V_T$ obtained by suitably changing the values of the aforementioned constants of integration $k'$ and $k''$.

Thus in accordance with this invention a reference angle signal generator can be simply constructed since it need only detect as many reference angles as there are cylinders in the engine. It is also possible to widen the ignition spark control range and improve accuracy and stability over a range of 0° to 90° as required in practical application. The invention is particularly advantageous when applied to six or eight cylinder engines and enables the variable control range to be widened where it was not possible with the former techniques.

What is claimed is:

1. An ignition spark timing control system for an internal combustion engine, said ignition timing control system including an advance angle control unit for generating an output signal in response to the magnitude of the vacuum in the intake manifold of the engine and to the rotational speed of the crank shaft of the engine, and an ignition unit connected to the distributor of the engine for developing a high DC voltage in response to the output of said advance angle control unit, wherein the improvement comprises;

(1) a reference angle signal generator for generating reference angle signals corresponding to respective reference angles of each cylinder of the engine;

(2) a divider for dividing said reference angle signals to provide divided signals;

(3) at least two voltage-advance angle converters sequentially operated in an alternative manner in response to said divided signals in dependence on the output signal of said advance angle control unit; and (4) an adder connected to said voltage-advance angle converters to develope a control signal by adding the outputs of said voltage-advance angle converters, said control signal being supplied to said ignition unit for controlling the ignition timing.

2. An ignition spark timing control system according to claim 1, in which said reference angle signal generator comprises a magnetic pole, a permanent magnet connected to said magnetic pole, and a coil surrounding said magnet. said magnetic pole being arranged such that it detects reference angles of a crankshaft for said each cylinder to generate said reference angle signals.

3. An ignition spark timing control system according to claim 1 wherein said divider is a flip-flop circuit.

4. An ignition spark timing control system according to claim 3, in which each of said voltage-advance converters comprises a first transistor having its gate terminal connected to one of the outputs of said flip-flop, a second transistor connected at its gate terminal to the collector of said first transistor, a first constant current circuit connected to the collector of said first transistor, a second constant current circuit connected to the collector of said second transistor, and a capacitor connected between said collectors of said first and second transistors.

5. An ignition spark timing control system according to claim 4, in which the value of electric current flowing through said first constant current circuit is proportional to said advance control signal.

* * * * *